(12) United States Patent
Schaefer et al.

(10) Patent No.: US 8,479,455 B2
(45) Date of Patent: Jul. 9, 2013

(54) FLASHING ASSEMBLY (75) Inventors: Richard F. Schaefer, Lafayette, CO (US); David Kreutzman, Lafayette, CO (US); Don N. Tamm, Lafayette, CO (US)

(73) Assignee: D Three Enterprises, Lafayette, CO (US)

( * ) Notice: Subject to any disclaimer, the term of this patent is extended or adjusted under 35 U.S.C. 154(b) by 0 days.

(21) Appl. No.: 13/274,182

(22) Filed: Oct. 14, 2011

(65) Prior Publication Data

US 2012/0090263 A1 Apr. 19, 2012

Related U.S. Application Data (60) Provisional application No. 61/393,245, filed on Oct. 14, 2010.

(51) Int. Cl.
*E04D 1/36* (2006.01)

(52) U.S. Cl.
USPC ............. 52/58; 52/220.8; 52/219; 174/564

(58) Field of Classification Search
USPC ............. 52/741.4, 62, 61, 220.8, 219, 58, 52/60; 248/237; 174/541, 564; 285/154.1, 285/46, 142.1, 143.1, 139.3
See application file for complete search history.

(56) References Cited

U.S. PATENT DOCUMENTS

| | | | |
|---|---|---|---|
| 3,104,120 A * | 9/1963 | Myers ......................... 285/154.1 |
| 4,640,535 A * | 2/1987 | Hermann .................. 285/148.14 |
| 4,739,596 A * | 4/1988 | Cunningham et al. ........ 52/220.8 |
| 5,482,329 A * | 1/1996 | McCall et al. .................. 285/39 |
| 5,594,202 A * | 1/1997 | Tobias .......................... 174/505 |
| 5,729,938 A * | 3/1998 | Tobias .......................... 52/220.8 |
| 6,360,491 B1 | 3/2002 | Ullman |
| 6,378,167 B1 * | 4/2002 | Howell et al. ..................... 16/2.1 |
| 6,516,741 B1 * | 2/2003 | Sorum et al. ............... 116/137 R |
| 6,526,701 B2 | 3/2003 | Stearns et al. |
| 6,698,799 B2 * | 3/2004 | Anderson et al. .......... 285/139.1 |
| 6,969,799 B2 * | 11/2005 | Snyder .......................... 174/483 |
| 7,128,345 B2 * | 10/2006 | Bartholoma et al. ..... 285/137.11 |
| 7,762,027 B1 | 7/2010 | Wentworth et al. |
| 7,861,485 B1 | 1/2011 | Wentworth et al. |
| 7,895,808 B1 | 3/2011 | Wentworth et al. |
| 7,905,064 B1 | 3/2011 | Wentworth et al. |
| 8,158,884 B2 * | 4/2012 | de la Borbolla ................ 174/54 |
| 8,166,713 B2 | 5/2012 | Stearns et al. |

(Continued)

OTHER PUBLICATIONS

SnapNrack Roof Mount Installation manual dated Sep. 16, 2009. (44 pages).

(Continued)

*Primary Examiner* — Robert Canfield
*Assistant Examiner* — Brent W Herring
(74) *Attorney, Agent, or Firm* — Margaret Polson; Oppedahl Patent Law Firm LLC (57) ABSTRACT

A flashing assembly comprising a base plate, flashing, flashing adapter and O-ring is disclosed. The flashing assembly components fit tightly together, creating a waterproof seal. The flashing assembly has no exposed rubber pieces, which prevents erosion and extends the life of the assembly. The waterproofing and durability of the disclosed flashing assembly make it ideal for enclosing electrical wires and running plumbing needs through the roof or wall membrane. The disclosed flashing assembly is capable of attaching to a number of products, including, but not limited to junction boxes, combiners, and service panels.

14 Claims, 8 Drawing Sheets

U.S. PATENT DOCUMENTS

| | | | |
|---|---|---|---|
| 8,181,398 B2 | 5/2012 | Stearns et al. | |
| 8,225,557 B2 | 7/2012 | Stearns et al. | |
| 8,245,454 B2 | 8/2012 | Stearns et al. | |
| 8,272,174 B2 | 9/2012 | Stearns et al. | |
| 2007/0137126 A1* | 6/2007 | Sommerhein | 52/302.1 |
| 2010/0192505 A1 | 8/2010 | Schaefer et al. | |
| 2010/0307074 A1 | 12/2010 | Stearns et al. | |
| 2011/0120047 A1 | 5/2011 | Stearns et al. | |
| 2011/0179727 A1 | 7/2011 | Liu | |
| 2011/0247279 A1 | 10/2011 | Stearns et al. | |
| 2011/0247295 A1 | 10/2011 | Stearns et al. | |
| 2012/0023843 A1 | 2/2012 | Stearns et al. | |
| 2012/0031019 A1 | 2/2012 | Stearns et al. | |
| 2012/0031024 A1* | 2/2012 | Selke et al. | 52/219 |

OTHER PUBLICATIONS

Office Action dated Dec. 20, 2012 in related U.S. Appl. No. 13/368,332.

Applicant's reply dated Feb. 6, 2013 to Office Action dated Dec. 20, 2012 in related U.S. Appl. No. 13/368,332.

* cited by examiner

FLASHING ASSEMBLY

CROSS REFERENCE APPLICATIONS

This application is a non-provisional application claiming the benefits of provisional application No. 61/393,245 filed Oct. 14, 2010, which is hereby incorporated by reference for all purposes. International application no. PCT/US10/23282 filed Feb. 5, 2010 is hereby incorporated by reference for all purposes.

BACKGROUND

Roof pipe and electrical flashings exist to seal penetrations on roofs. Prior art pipe and electrical flashings provide elastic seals which utilize a combination of metal and rubber pieces. These rubber pieces are exposed to the elements and eventually degrade, allowing elements such as moisture in the home.

The foregoing example of the related art and limitations related therewith are intended to be illustrative and not exclusive. Other limitations of the related art will become apparent to those of skill in the art upon a reading of the specification and a study of the drawings.

SUMMARY

The following embodiments and aspects thereof are described and illustrated in conjunction with systems, tool and methods which are meant to be exemplary and illustrative, not limiting in scope. In various embodiments, one or more of the above described problems have been reduced or eliminated, while other embodiments are directed to other improvements.

One aspect of the flashing assembly described herein is a waterproof assembly for use in running electrical or other connections from the inside of a building to the outside. The flashing assembly could be used with tubing, wiring, gas, liquid or air connections as desired. Another aspect of the device described herein is to provide a flashing assembly which requires no caulking or exposed rubber or other flexible sealing members.

In addition to the exemplary aspects and embodiments described above, further aspects and embodiments will become apparent by reference to the accompanying drawings forming a part of this specification wherein like reference characters designate corresponding parts in the several views.

Before explaining the disclosed embodiment of the present invention in detail, it is to be understood that the invention is not limited in its application to the details of the particular arrangement shown, since the invention is capable of other embodiments. Exemplary embodiments are illustrated in referenced figures of the drawings. It is intended that the embodiments and figures disclosed herein are to be considered illustrative rather than limiting. Also, the terminology used herein is for the purpose of description and not of limitation.

DETAILED DESCRIPTION OF THE DRAWINGS

Figure 1:
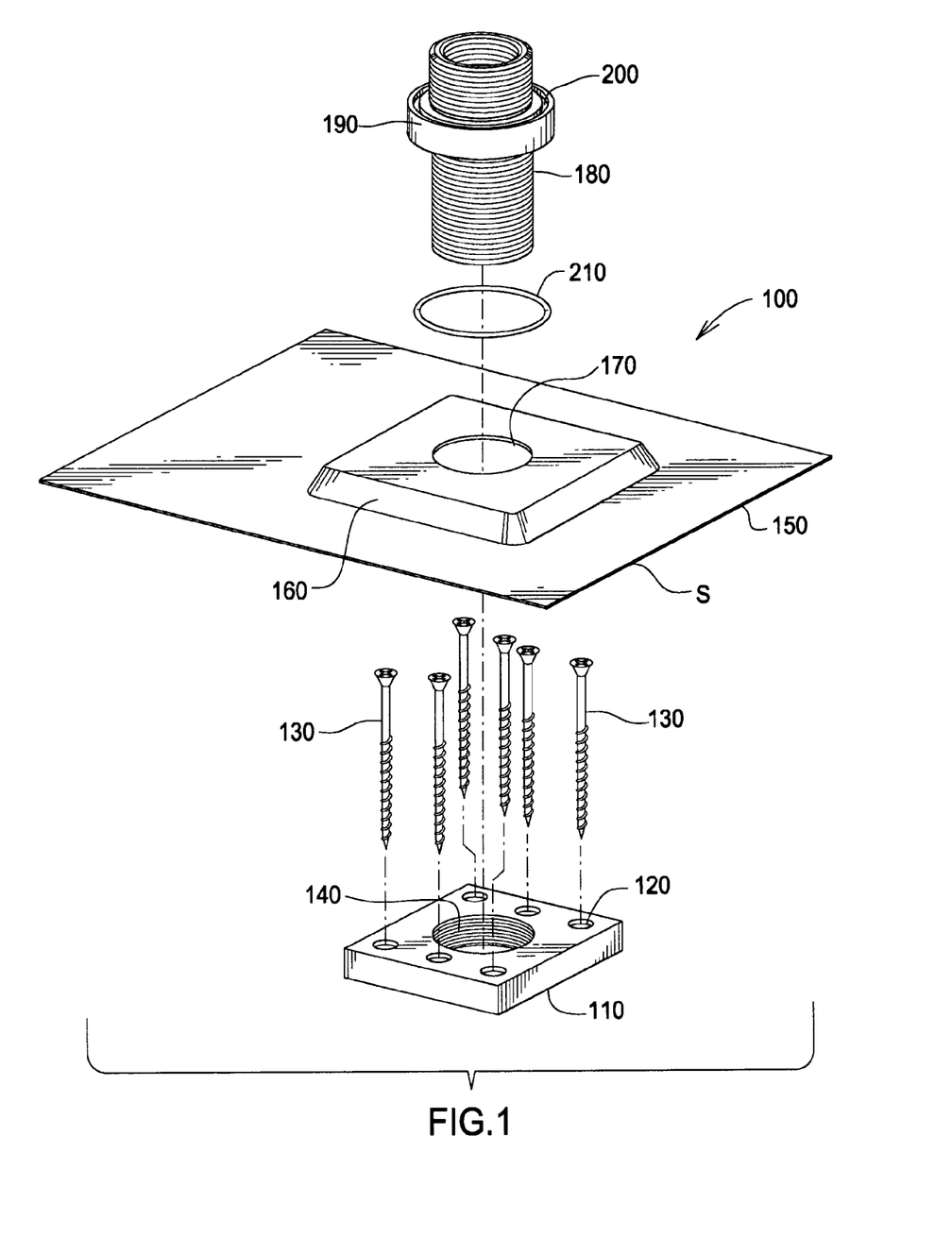
FIG. 1 is an exploded view of an exemplary flashing assembly.
Figure 2:
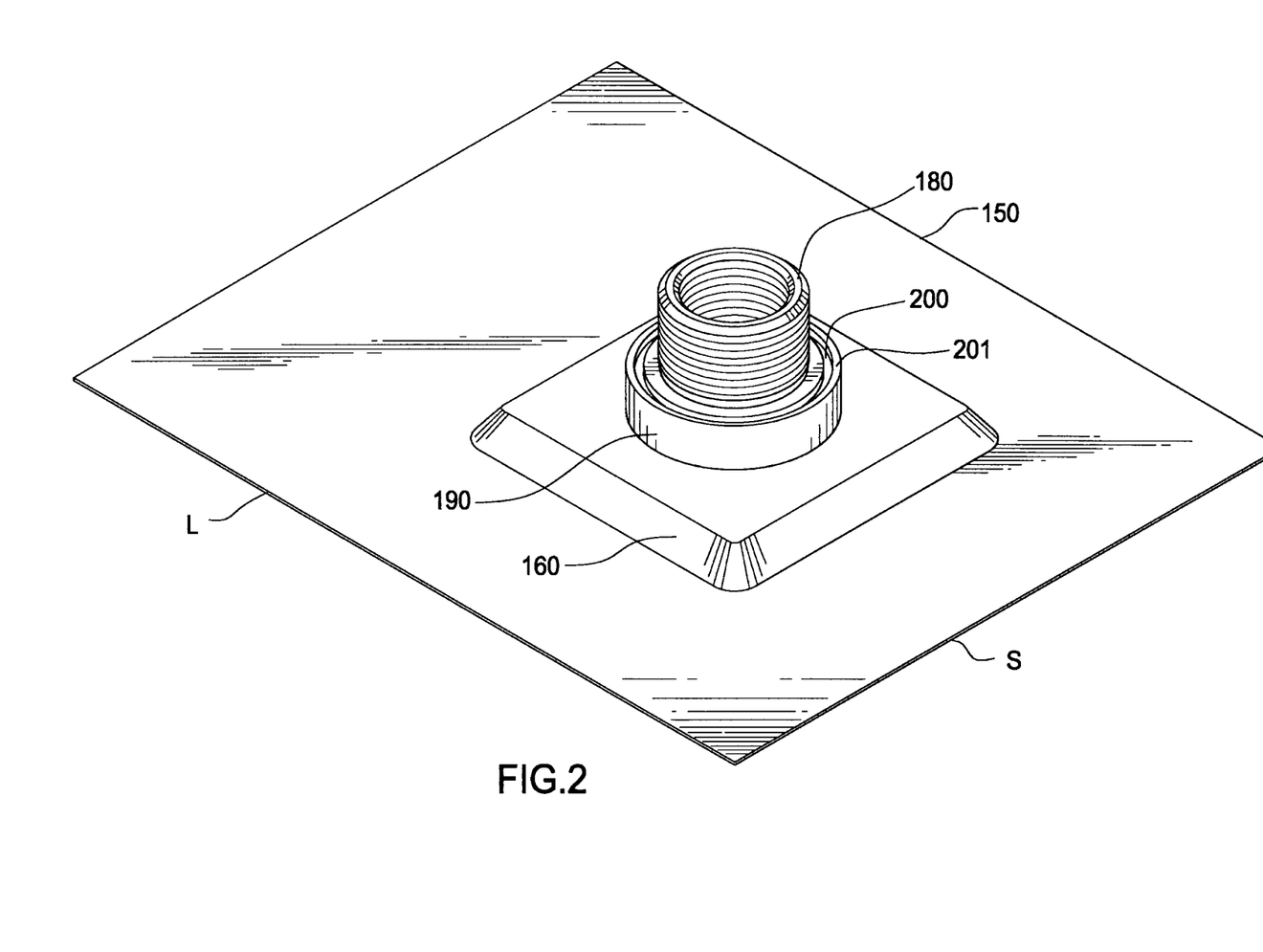
FIG. 2 is a perspective view of the assembled flashing assembly of FIG. 1.

Turning first to FIGS. 1-2, a flashing assembly 100 comprises a base plate 110, flashing 150, O-ring 210, and flashing adapter 180. In the depicted embodiment, O-ring 210 is a 2-136 high-temperature silicone O-ring. In addition to an O-ring a silicone washer could be used as well. Those having an ordinary level of skill in the art will understand that materials having similar properties to silicone could be used.

Base plate 110 has a series of bolt holes 120 sized to accept bolts 130 for attaching base plate 110 to a roof or other flat surface. Base plate 110 contains a threaded hole 140. In the depicted embodiment, base plate 110 is metal. Base plate 110 can be a variety of metals, such as aluminum, stainless steel or zinc plated steel, for example.

Flashing 150 includes a raised portion 160, which is sized to fit over base plate 110. A hole 170 in raised portion 160 fits over threaded hole 140. The raised portion is off-center, creating a long side L and short side S. In the depicted embodiment, long side L of flashing 150 is approximately 12.5 inches long and short side S is approximately 10 inches wide. Raised portion 160 is approximately 0.6 inches high. In the depicted embodiment, flashing 150 is metal. In the depicted embodiment, flashing 150 comprises 26 gauge galvanized steel. Optionally, flashing 150 may be coated with a resin coating, such as Kynar 500.

Flashing adapter 180 is hollow, with both internal and external threading on each end in the depicted embodiment. If desired, only some areas could have threading. A sealing ridge 190 extends radially from the outer surface of the flashing adapter around the circumference of flashing adapter 180 dividing the flashing adapter into a first and second end. Sealing ridge 190 includes groove 200, which houses O-ring 210. Lip 201 encircles the edge of groove 200. Each side of sealing ridge 190 facing toward the first and second ends has a sealing surface 202 with a groove 200 and lip 201 on for an O-ring 210. Sealing ridge 190 can be located anywhere along the length of flashing adapter 180.

In the depicted embodiment, sealing ridge 190 is located off-center of the total length flashing adapter 180, meaning that the first and second ends are two different lengths. This configuration gives a user two distinct options for the height of the components. In the depicted embodiment, flashing adapter 180 comprises either aluminum or stainless steel. While aluminum or stainless steel are depicted, any material having similar properties can be used. In the depicted embodiment, flashing adapter 180 is threaded to allow for a 1¼" compression fitting. In the depicted embodiment, flashing adapter 180 has 1¼"×11.5 National Pipe Thread Tapered Thread (NPT) threads on the outer diameter and 1" NPT threads on the inner diameter.

In use, a base plate 110 is attached to a desired surface with bolts 130. Most commonly, the desired surface will be a roof or wall. Flashing 150 is designed to slide beneath the shingles above the point of roof penetration. A user will choose an area on the roof to create a hole that is not directly above any joists or bracing. A user will then measure approximately 2.5 to 2.625 inches down from the upper edge of the shingle and create a center mark for a hole. In the depicted embodiment, a 1.75 inch diameter hole saw is used to create a hole on the center mark. This hole will extend through all roofing materials. Base plate 110 is then placed above the hole with the counter sunk hole features facing up. Base plate 110 is centered over the hole and rotated so it is square and level with the shingles. Once the base plate 110 is properly aligned, it is secured with bolts. In the depicted embodiment, six #10×1.5 inch Spax, wood to wood, zinc plated counter sunk screws are used to attach base plate 110. Those skilled in the art will understand that differing numbers and types of screws could be substituted with the same result. The base plate 110 shown in the depicted embodiment is designed for use when the flashing adaptor will not have a large amount of weight attached to it. One skilled in the art will understand that the size, shape and thickness of the base plate 110 is not limited to the depicted embodiment and that the form of the base plate 110 can be chosen to suite the load needed to be borne by the base plate 110.

Flashing 150 is then inserted underneath the shingles by sliding long end L beneath the shingles directly above base plate 110. Flashing 150 is adjusted so that hole 170 is located above hole 140. Flashing 150 covers the bolt holes 120 in base plate 110, which prevents moisture from entering through bolt holes 120. Once the flashing 150 is mounted, it can be used to secure either electric or thermal components. A different, installation would be used on a tile roof.

To install electrical components, O-ring 210 is placed over the long end of flashing adapter 180 and into groove 200. A thin coating of silicone grease or petroleum jelly is applied to the exposed surfaces of O-ring 210. Optionally, a conduit may be attached to the long end of flashing adapter 180 via its threads. The long side of flashing adapter 180 is inserted into threaded hole 140 and tightened until O-ring 210 is flush with flashing 150, forming a water tight seal of lip 201 of sealing ridge 190 to flashing 150 and fixing flashing 150 into place over base plate 110. The metal to metal seal between lip 201 of sealing ridge 190 and flashing 150 completely encapsulates O-ring 210. The encapsulation of O-ring 210 prevents degradation of O-ring 210 by protecting it from the elements. Further, the metal to metal seal between lip 201 sealing ridge 190 and flashing 150 provides grounding to the unit if desired. The electrical flashing assembly 100 is now ready to accept a junction box or conduit body. The wiring or tubing can be fed through the hollow center to extend from side the building to outside the building in water proof manner. A variety of products can be threaded on to the exposed end of the flashing adapter, including, but not limited to, junction boxes, combiners and/or service panels. If electrical flashing 100 is installed on a metal roof, flashing 150 is omitted. In this case, sealing ridge 190 contacts base plate 110 to completely encapsulate O-ring 210.

Figure 3:
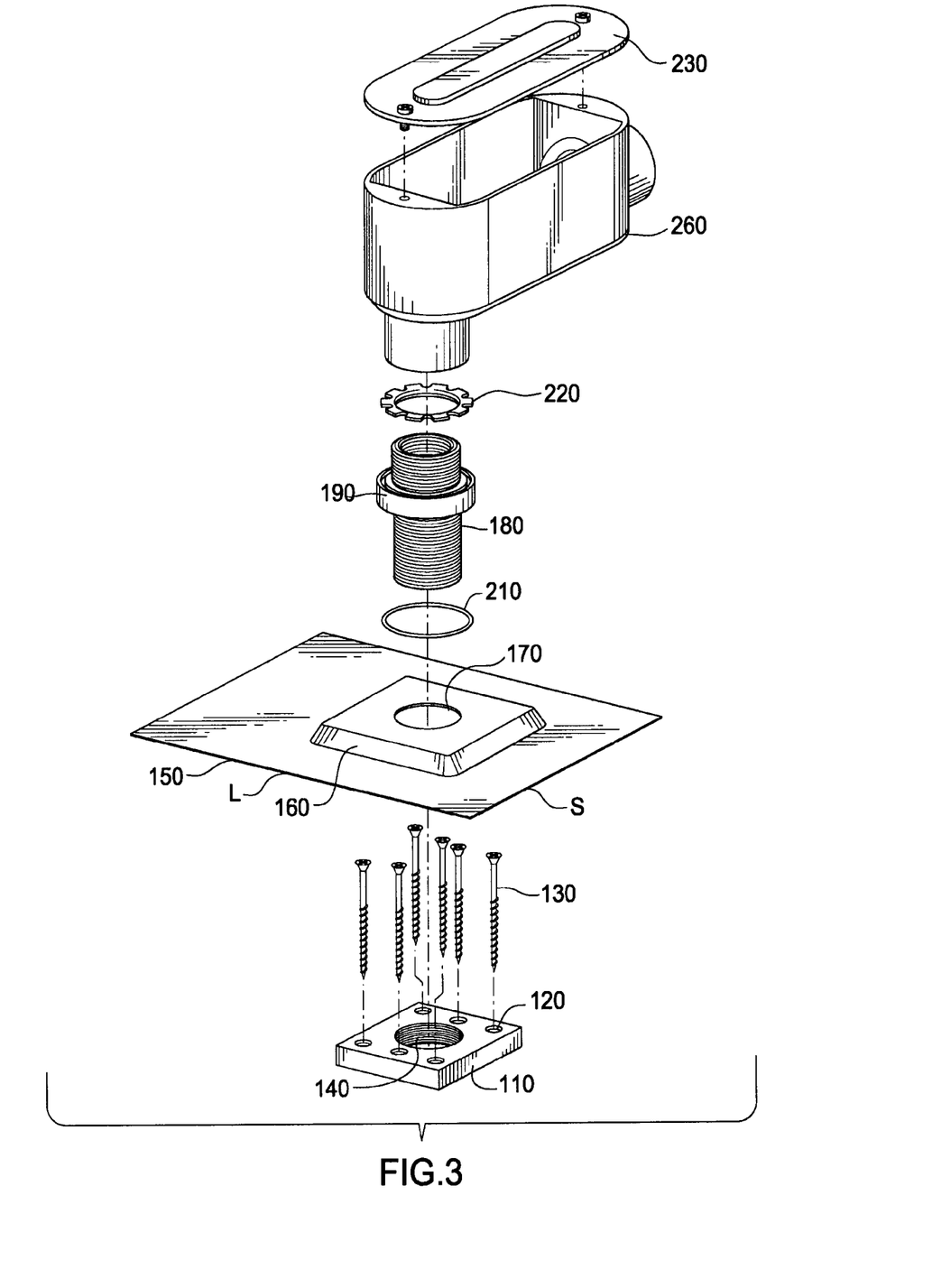
FIG. 3 is an exploded view of an electrical flashing assembly including a conduit body.
Figure 4:
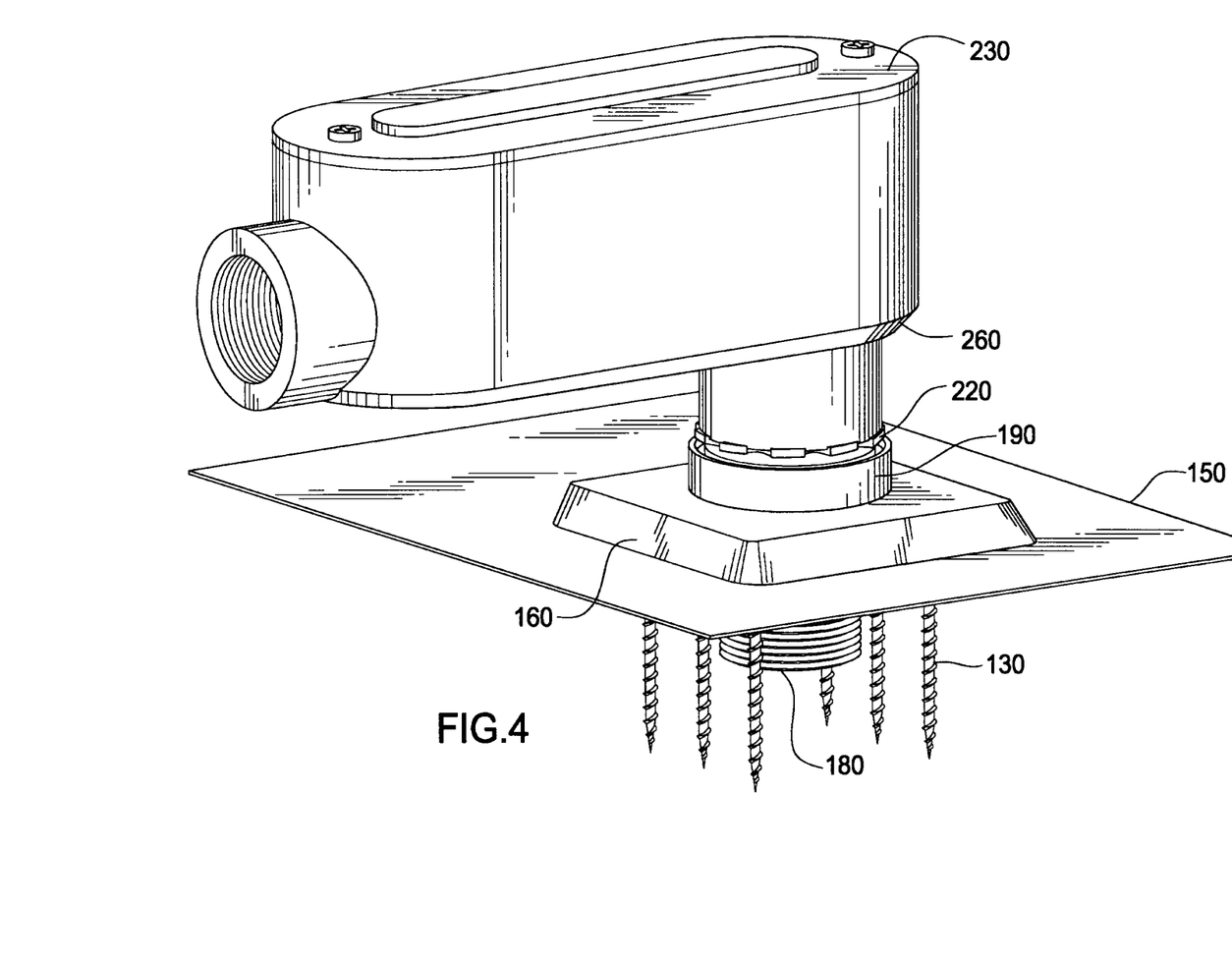
FIG. 4 is a perspective view of the assembled electrical flashing assembly of FIG. 3.

Turning to FIGS. 3 and 4, the components for mounting a conduit are shown. To mount a conduit, a locking ring 220 is placed over the top of flashing adapter 180 into second groove 200. A conduit body 260 is then threaded onto flashing adapter 180. Conduit body 260 includes a cover 230. The product can be a variety of size and shapes, so long as a threaded hole is included for attachment to flashing adapter 180. Electrical wiring can then be run from the product through flashing adapter 180 into a house. Various pipes to hold the wiring can be threaded into the internal threading of flashing adapter 180 to provide more connection possibilities.

In the depicted embodiment, conduit body is an LB style, 1.5 inch, aluminum body. However, any other electrical boxes that can be mounted on a 1.66 inch threaded stud could be substituted.

Figure 5:
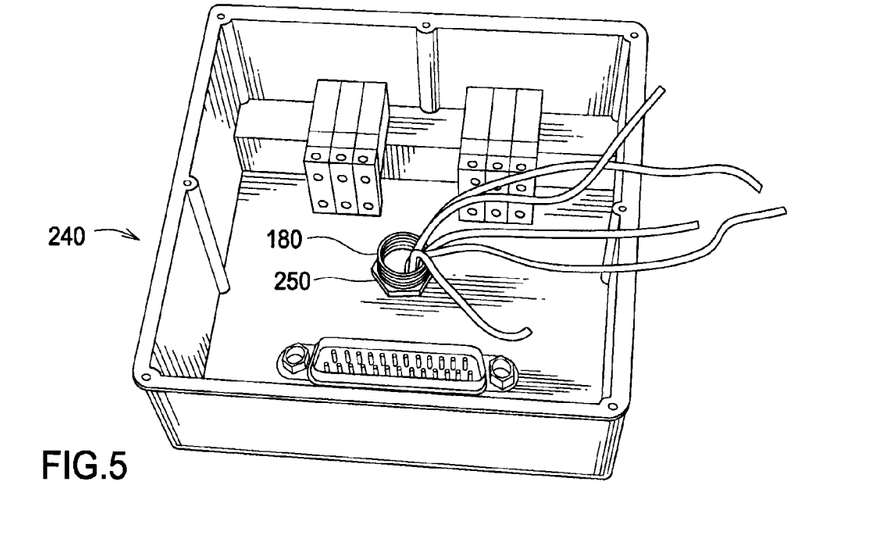
FIG. 5 is a perspective view of an assembled electrical flashing assembly including a junction box.
Figure 6:
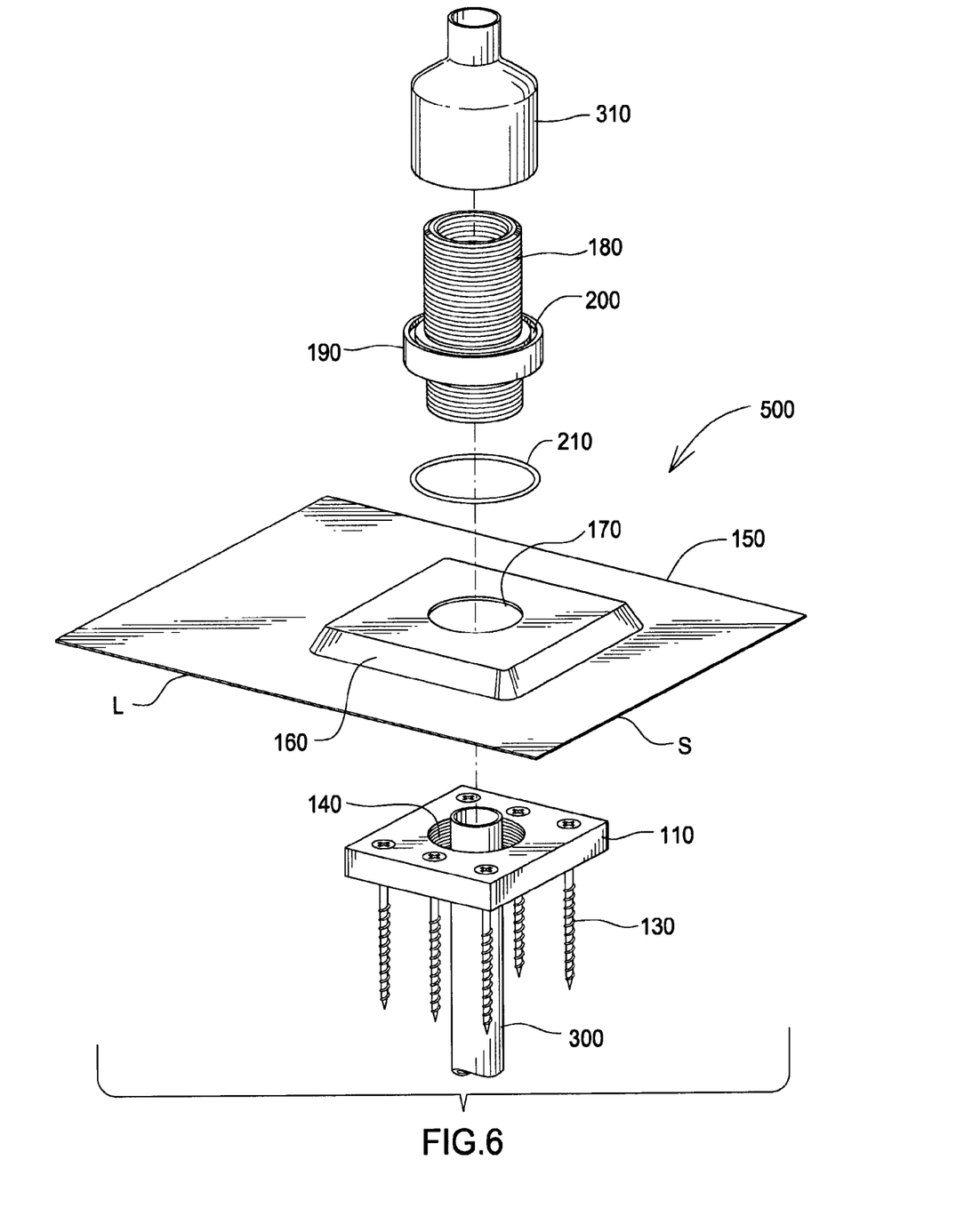
FIG. 6 is an exploded view of a thermal flashing assembly.
Figure 7:
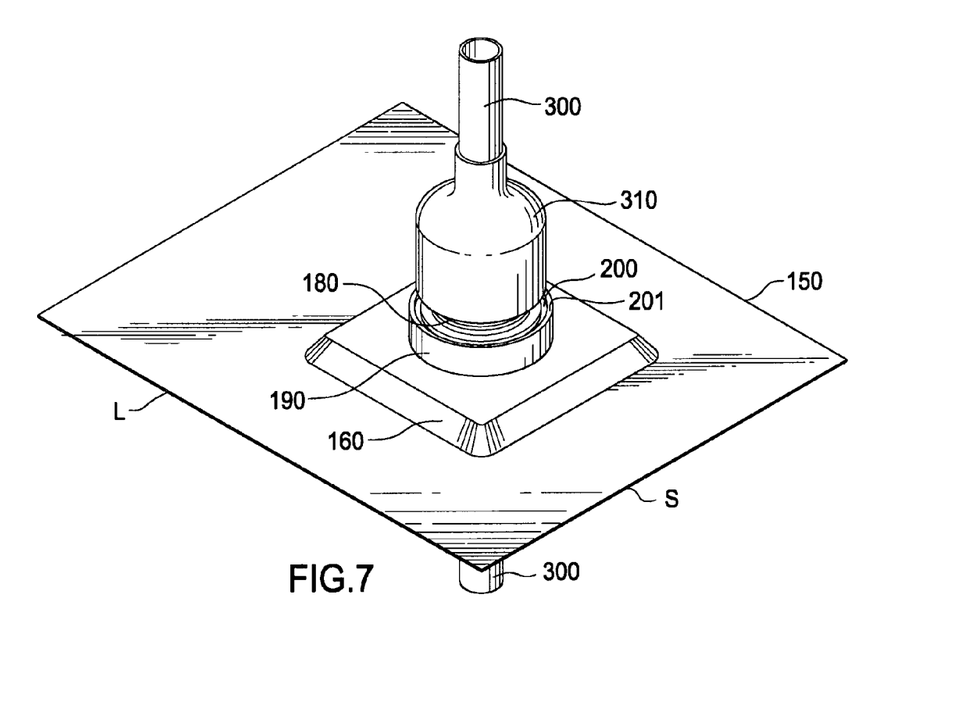
FIG. 7 is a perspective view of the assembled thermal flashing assembly of FIGS. 6.
Figure 8:
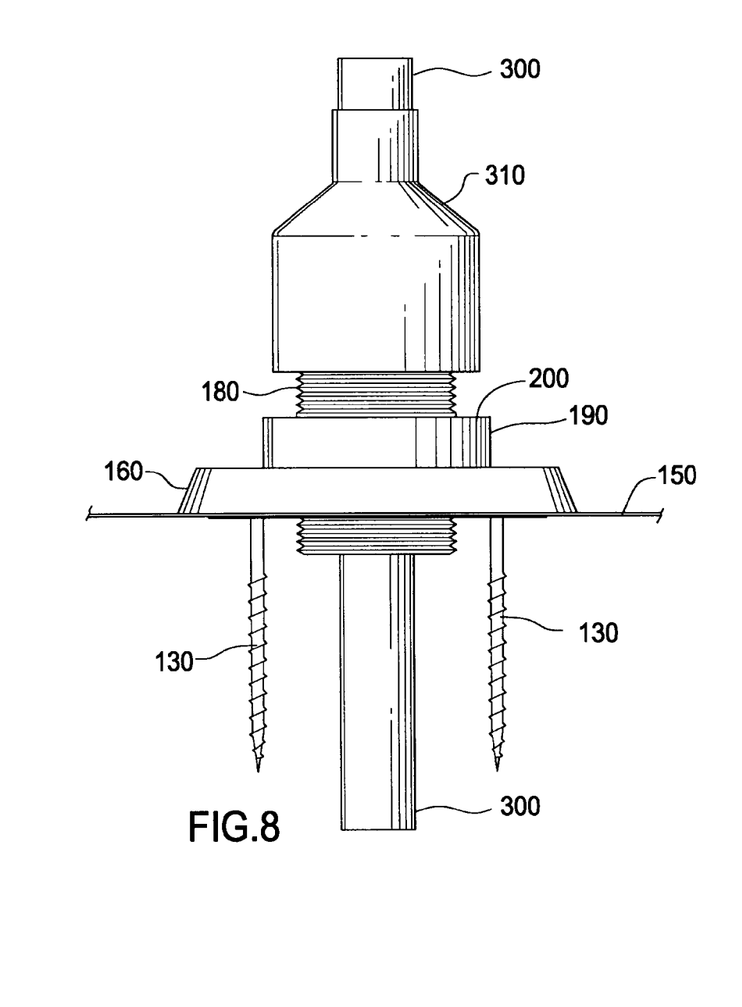
FIG. 8 is side view of the thermal flashing assembly of FIG. 7.
Figure 9:
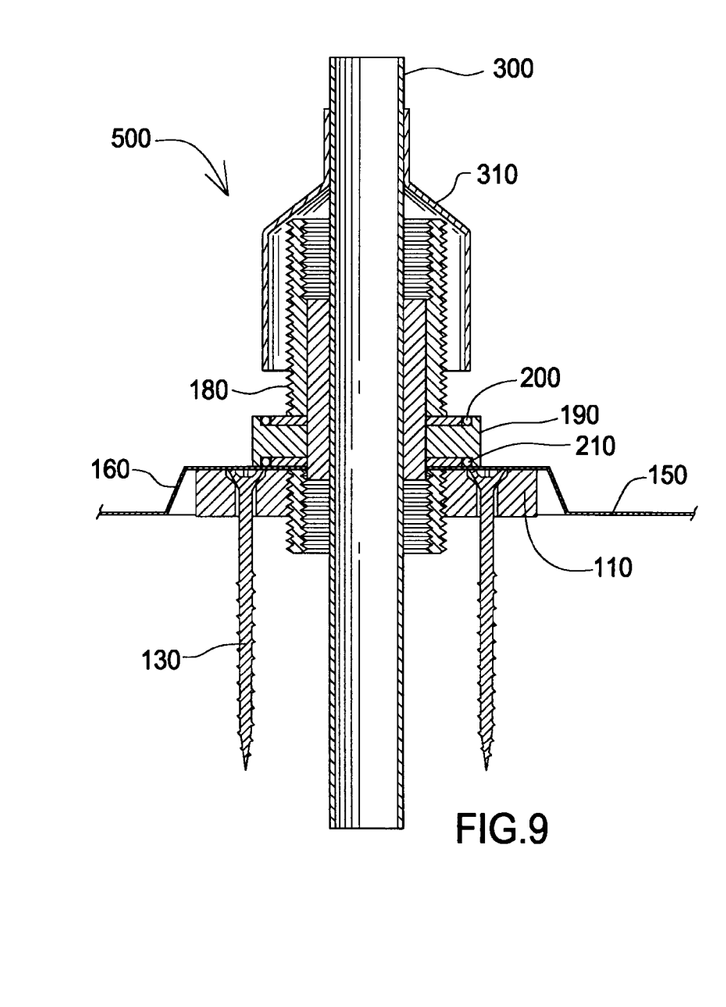
FIG. 9 is a side cutaway view of the thermal flashing assembly of FIG. 8.

Turning to FIG. 5, a junction box 240 is shown mounted using electrical flashing assembly 100. To mount the junction box 240, a hole is cut in the back of the junction box 240. The junction box 240 is then mounted on the flashing adapter 180. An appropriately sized nut 250 is threaded onto the flashing adapter 180 and tightened. Electrical wiring can then be run from the junction box 240 through flashing adapter 180 into a house. Various pipes to hold the wiring can be threaded into the internal threading of flashing adapter 180 to provide more connection possibilities.

Turning next to FIGS. 6-9, a thermal flashing assembly 500 is shown. Many of the components are the same as those used for electrical flashing assembly 100. Thermal flashing assembly 500 comprises a base plate 110, flashing 150, O-ring 210, and flashing adapter 180 in the depicted embodiment. In the depicted embodiment, O-ring 210 is a 2-136 high-temperature silicone O-ring. One skilled in the art will recognize that any material having similar properties to silicone could be substituted.

Base plate 110 has a series of bolt holes 120 sized to accept blots 130 for attaching base plate 110 to a roof. Base plate 110 contains a threaded hole 140. In the depicted embodiment, base plate 110 is metal. Base plate 110 can be a variety of metals, such as aluminum, stainless steel or zinc plated steel, for example.

Flashing 150 includes a raised portion 160, which is sized to fit over base plate 110. A hole 170 in raised portion 160 fits over threaded hole 140. The raised portion is off-center, creating a long side L and short side S. In the depicted embodiment, flashing 150 is metal. In the depicted embodiment, long side L of flashing 150 is approximately 12.5 inches long and short side S is approximately 10 inches wide. Raised portion 160 is approximately 0.6 inches high. In the depicted embodiment, flashing 150 is metal. In the depicted embodiment, flashing 150 comprises 26 gauge galvanized steel. Optionally, flashing 150 may be coated with a resin coating, such as Kynar 500. As before, with some surfaces such as metal roofs, flash 150 would be omitted.

Flashing adapter 180 is hollow, with both internal and external threading on each end in the depicted embodiment. If desired, only some areas could have threading. A sealing ridge 190 extends radially from the outer surface of the flashing adapter around the circumference of flashing adapter 180 dividing the flashing adapter into a first and second end. Sealing ridge 190 includes groove 200, which houses O-ring 210. Lip 201 encircles the edge of groove 200. Each side of sealing ridge 190 facing toward the first and second ends has a sealing surface 202 with a groove 200 and lip 201 on for an O-ring 210. Sealing ridge 190 can be located anywhere along the length of flashing adapter 180. In the depicted embodiment, sealing ridge 190 is located off-center of the total length flashing adapter 180, meaning that the first and second ends are two different lengths. This configuration gives a user two distinct options for the height of the components. In the depicted embodiment, flashing adapter 180 comprises either aluminum or stainless steel. While aluminum or stainless steel are depicted, any material having similar properties can be used. In the depicted embodiment, flashing adapter 180 is threaded to allow for a 1¼" compression fitting. In the depicted embodiment, flashing adapter 180 has 1¼"×11.5 National Pipe Thread Tapered Thread (NPT) threads on the outer diameter and 1" NPT threads on the inner diameter.

To install thermal components, O-ring 210 is placed over the short end of flashing adapter 180 and into groove 200. A thin coating of silicone grease or petroleum jelly is applied to the exposed surfaces of O-ring 210. The short end of flashing adapter 180 is inserted into threaded hole 140 and tightened until O-ring 210 is flush with flashing 150, forming a water tight seal of sealing ridge 190 to flashing 150 and fixing flashing 150 into place over base plate 110. The metal to metal seal between sealing ridge 190 and flashing 150 completely encapsulates O-ring 210. The encapsulation of O-ring 210 prevents degradation of O-ring 210 by protecting it from the elements. A copper pipe 300 can then be placed into flashing adapter 180 and attached beneath the roof rim. An appropriately sized copper cap, or reducer, 310 is placed on top of copper pipe 300 and sweated thereto. In the depicted embodiment, copper pipe is ¾ inch or 1 inch and copper cap is ¾ inch×2 inches or 1 inch×2 inches. One having ordinary skill in the art will understand that pipes and caps of varying sizes and compositions could be used with the same result.

The combination of the components used to create flashing assemblies 100 and 500 renders flashing assemblies 100 and 500 completely waterproof. Additionally, the precise fitting together of the components removes and/or reduces the need for rubber or caulk to seals gaps at the hole in the roof, which both prolongs the life of flashing assemblies 100 and 500 and greatly reduces the possibility of future leaks. If desired and/or necessary the edges of flashing 150 can be sealed to the surface of roof or wall.

A number of adjustments and modifications may be made to flashing assemblies 100 and 500. For example, a rigid metal conduit may be inserted into either end of flashing adapter 180 to provide additional length.

Figure 10:
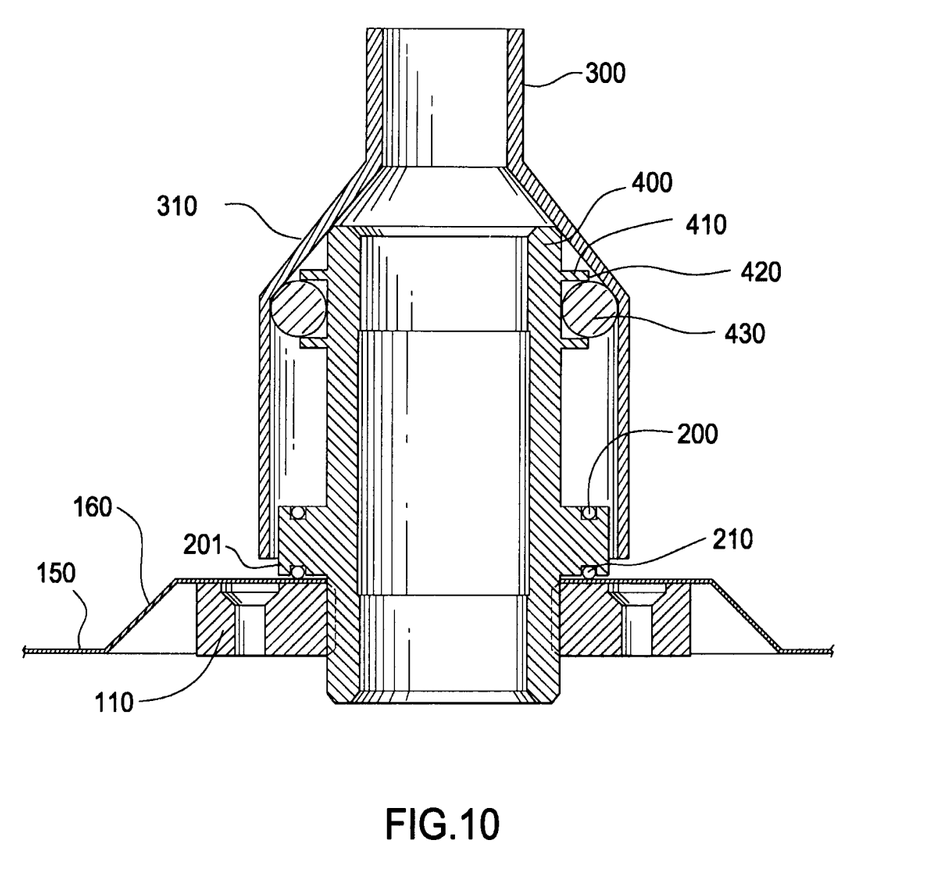
FIG. 10 is cross sectional view of an alternate embodiment of the thermal flashing assembly.

FIG. 10 shows an alternate embodiment of flashing adapter 400 with second sealing ridge 410. The second sealing ridge 410 has a groove 420 that is on the outer diameter of sealing ridge. O-ring 430 is held in place on flashing adapter 400 by second sealing ridge 410. This creates a water tight seal between reducer 310 and flashing adapter 400. All other component of the assembly are the same and function as described above.

In addition to forming a water tight channel to allow wires, pipes and other items to pass from the inside of a building to the outside of a building, the flashing adaptors can both be used structurally with proper attachment to a roof. The base plate 110, 140 could be used with larger screws, bolts or even backing plate (not shown). A base plate could be specifically design for structural support as well (not shown). This would allow structural and/or heavy components to be attached to an end of the flashing adaptor 180 while still allowing tubing, wiring, gas, liquid, air, etc to pass thru the adapter, which obviously can be size accordingly (larger or smaller). The adapter can be made larger or higher to accommodate this feature. The existing adapter can also be coupled with piping on the outside diameter (currently 1.25 inch) or the inside diameter (currently 1, but obviously larger/smaller size and variety of material including thermal plastics can be used.

This would allow the flashing adapter to be used both structurally as an attachment to a rack, roof top unit, pole, satellite, etc, AND/OR simultaneously/singularly can serve the purpose of a chase, raceway for wire, pipe, air, liquid, gas, etc. An example would be using this as a support for satellite dishes with the cable running thru the piping to a junction box or other type of waterproof termination on the pipe top/side, etc. The base of the satellite dish could be threaded directly on to the flashing adaptor 180.

While a number of exemplary aspects and embodiments have been discussed above, those of skill in the art will recognize certain modifications, permutations, additions and sub-combinations therefore. It is therefore intended that the following appended claims hereinafter introduced are interpreted to include all such modifications, permutations, additions and sub-combinations are within their true spirit and scope. Each apparatus embodiment described herein has numerous equivalents.

The terms and expressions which have been employed are used as terms of description and not of limitation, and there is no intention in the use of such terms and expressions of excluding any equivalents of the features shown and described or portions thereof, but it is recognized that various modifications are possible within the scope of the invention claimed. Thus, it should be understood that although the present invention has been specifically disclosed by preferred embodiments and optional features, modification and variation of the concepts herein disclosed may be resorted to by those skilled in the art, and that such modifications and variations are considered to be within the scope of this invention as defined by the appended claims. Whenever a range is given in the specification, all intermediate ranges and subranges, as well as all individual values included in the ranges given are intended to be included in the disclosure. When a Markush group or other grouping is used herein, all individual members of the group and all combinations and subcombinations possible of the group are intended to be individually included in the disclosure.

In general the terms and phrases used herein have their art-recognized meaning, which can be found by reference to standard texts, journal references and contexts known to those skilled in the art. The above definitions are provided to clarify their specific use in the context of the invention.

All patents and publications mentioned in the specification are indicative of the levels of skill of those skilled in the art to which the invention pertains. All references cited herein are hereby incorporated by reference to the extent that there is no inconsistency with the disclosure of this specification. Some references provided herein are incorporated by reference herein to provide details concerning additional starting materials, additional methods of synthesis, additional methods of analysis and additional uses of the invention.

We claim:

1. A flashing assembly for use on an external surface of a building to pass a connection through a hole extending through the external surface of a building, and flashing assembly comprising:
   a base plate having mounting holes for attachment to the external surface of the building and central hole, said mounting holes being located around the central hole;
   at least a portion of said base plate configured to rest on an external surface of a building and the central hole configured to align with the hole extending through the external surface of the building;
   a hollow flashing adapter having and inner surface, an outer surface and a first open end and a second open end;
   a sealing ridge extending radially from the outer surface of the flashing adapter;
   said sealing ridge having two sealing surfaces, said sealing surfaces oriented towards the first and second open end of the flashing adapter respectively;
   said sealing ridge including a channel on at least one of the two sealing surfaces;
   an O-ring mounted in said channel of one of said sealing surfaces;

a flashing having a raised section and a portion extending beyond the raised section, the raised section mounted over the base plate and substantially covering said base plate in use;

said flashing having a central hole in the raised section, said central hole aligning with the central hole of the base plate in use;

said portion of flashing extending beyond the raised section configured such that the flashing is resting on the building surface surrounding the base plate and said flashing functioning to prevent water from getting to the base plate mounting holes;

said first end of said flashing adapter adapted to be mounted to said base plate;

wherein said sealing ridge covers said O-ring when either the first or second open end of the flashing adapter is mounted in said base plate; and wherein the flashing adapter is configured to extend through the hole extending through the external surface of the building when either the first or second open end of the flashing adapter is mounted in the central hole of the base plate.

2. The flashing assembly of claim 1, wherein said base plate and said flashing adapter comprise metal.

3. The flashing assembly of claim 1, wherein said flashing contacts said one of said sealing surfaces to encapsulate said o-ring.

4. The flashing assembly of claim 1, further comprising:
a locking ring mounted on said second end of said flashing adapter; and
a conduit body mounted to said second end of said flashing adapter on top of said locking ring.

5. The flashing assembly of claim 1, further comprising:
a junction box mounted to said second end of said flashing adapter; and
a nut mounted on said second end of said flashing adapter over said junction box.

6. The flashing assembly of claim 1, further comprising:
a pipe mounted in said flashing adapter; and
a cap mounted over said pipe onto said second end of said flashing adapter.

7. The flashing assembly of claim 6, wherein said pipe and said cap comprise copper.

8. The flashing assembly of claim 1, wherein said base plate, said flashing adapter and said flashing comprise metal.

9. The flashing assembly of claim 1, wherein said flashing contacts said sealing surface to encapsulate said O-ring.

10. The flashing assembly of claim 1, further comprising:
a locking ring mounted on said second end of said flashing adapter; and
a conduit body mounted to said second end of said flashing adapter on top of said locking ring.

11. The flashing assembly of claim 1, further comprising:
a junction box mounted to said second end of said flashing adapter; and
a nut mounted on said second end of said flashing adapter over said junction box.

12. The flashing assembly of claim 1, further comprising:
a pipe extending through said flashing adapter; and
a cap mounted over said pipe onto said second end of said flashing adapter.

13. The flashing assembly of claim 12, further comprising:
a second sealing ridge having a radial groove and a second O-ring mounted in said groove functioning to seal said cap.

14. The flashing assembly of claim 1, wherein the base plate is located entirely on an exterior of the building.

* * * * *